United States Patent [19]
Kogej

[11] Patent Number: 5,231,906
[45] Date of Patent: Aug. 3, 1993

[54] TABLE SAW GUARD

[76] Inventor: Julien Kogej, 2326 Clement Ave., Alameda, Calif. 94501

[21] Appl. No.: 953,222

[22] Filed: Sep. 30, 1992

[51] Int. Cl.5 ............................................. B27G 19/02
[52] U.S. Cl. .................................... 83/478; 83/440.2; 83/544
[58] Field of Search ................... 83/478, 477.2, 440.2, 83/544, 546, DIG. 1

[56] References Cited

U.S. PATENT DOCUMENTS

| 264,412 | 9/1882 | Kuhlmann . | |
|---|---|---|---|
| 2,593,596 | 4/1952 | Olson . | |
| 2,731,049 | 1/1956 | Akin | 83/478 |
| 3,289,713 | 12/1966 | Herzog | 83/477.2 |
| 3,808,932 | 5/1974 | Russell | 83/478 |
| 3,880,032 | 4/1975 | Green | 83/478 X |
| 4,842,031 | 6/1989 | Peek | 83/478 X |
| 4,962,685 | 10/1990 | Hagstrom | 83/397 |

*Primary Examiner*—Eugenia Jones
*Attorney, Agent, or Firm*—Stanley P. Fisher

[57] ABSTRACT

A saw guard for a table saw having a horizontal table with a blade access opening and a saw blade extending through the access opening to project above the surface of the table including a blade access opening cover disposed in the access opening and confirming to the shape thereof, the access opening cover being flush with the top surface of the horizontal table and having an elongated slit formed therein for permitting the saw blade to extend upwardly therethrough. A guide post is fixedly secured to the trailing portion of the blade access opening cover to extend vertically above the horizontal table with a table saw guard mounted on the guide post so as to be vertically slideable on the guide post such that the table saw guard rests on the access opening cover when a cutting operation is not in progress and wherein the saw guard slides upwardly on the guide post during a cutting operation in response to material to be cut being fed into the saw blade.

5 Claims, 4 Drawing Sheets

TABLE SAW GUARD

BACKGROUND OF THE INVENTION

1. Field of the Invention

The present invention relates generally to a table saw guard, and more particularly to a guard for protecting an operator from coming into contact with the cutting portion of a table saw blade during operation.

2. Description of the Prior Art

Power driven saws have always been recognized as being potentially dangerous to the operator, and have therefore been provided with a guard mechanism to shield the blade and prevent accidental engagement with an operator's hand.

Such prior art guard mechanism have, for the most part, been successful at protecting the operator. However, such prior art devices have generally been complex, cumbersome, difficult to assemble and disassemble and have created difficulties for the operator.

In some causes, the guard mechanism of the prior art have created sufficient difficulties that the operator has discarded the guard resulting in a dangerous opening condition.

SUMMARY OF THE INVENTION

It is therefore an object of the present invention to provide a table saw guard which is easily installed and removed.

A further object of this invention is to provide a table saw guard which can be installed on a conventional table saw without necessitating any modification of the table saw.

A still further object of this invention is to provide a table saw guard which operates in a relatively simple and smooth manner.

A still further object of this invention is to provide a table saw guard which assists in the removal of saw dust so as to give the operator an unimpeded view of the work piece during the cutting operation.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
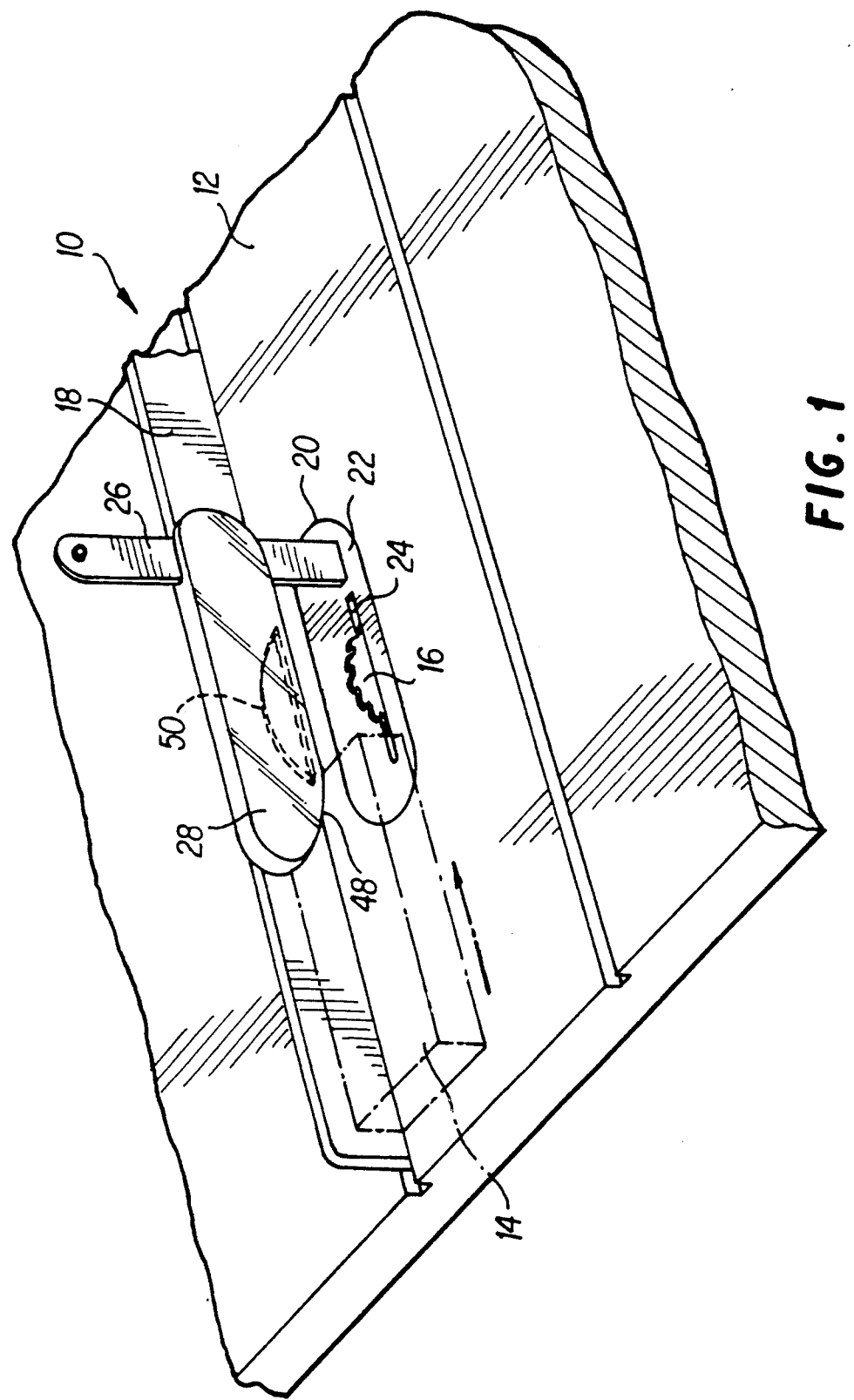
FIG. 1 is a perspective view of the saw guard of the present invention associated with a tale saw set up to perform a ripping operation.

With reference to the figures, wherein like reference characters indicate like elements throughout the several views and, in particular, with reference to FIG. 1, wherein there is shown a table saw 10 having a table 12 upon which is moved a material 14 to be cut by a blade 16. A material guide 18 is mounted on table 12 to determine the width of material to be cut.

A blade access opening 20 is provided with an access opening cover 22 which is easily inserted and removed from the table 12. The access opening cover is provided with an elongated slit 24 to permit the blade to be exposed above table 12 to engage the material 14.

A guide post 26 is fixed to the access opening cover 22, and has a table saw guard 28 slidably mounted thereon. Table saw guard 28 may be constructed of plexiglass or similar transparent material.

Figure 2:
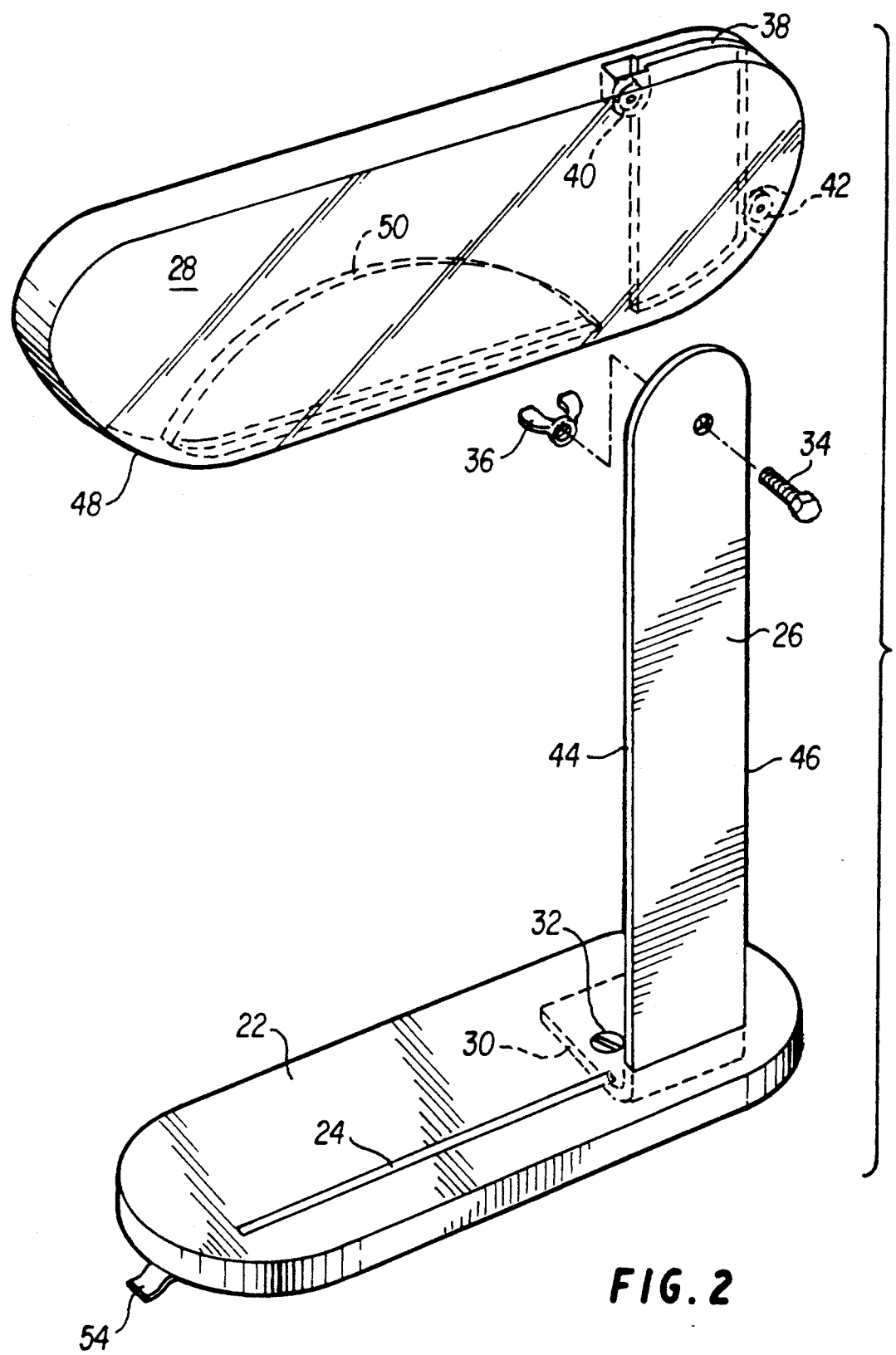
FIG. 2 is an exploded view of the saw guard of the present invention.
Figure 3:
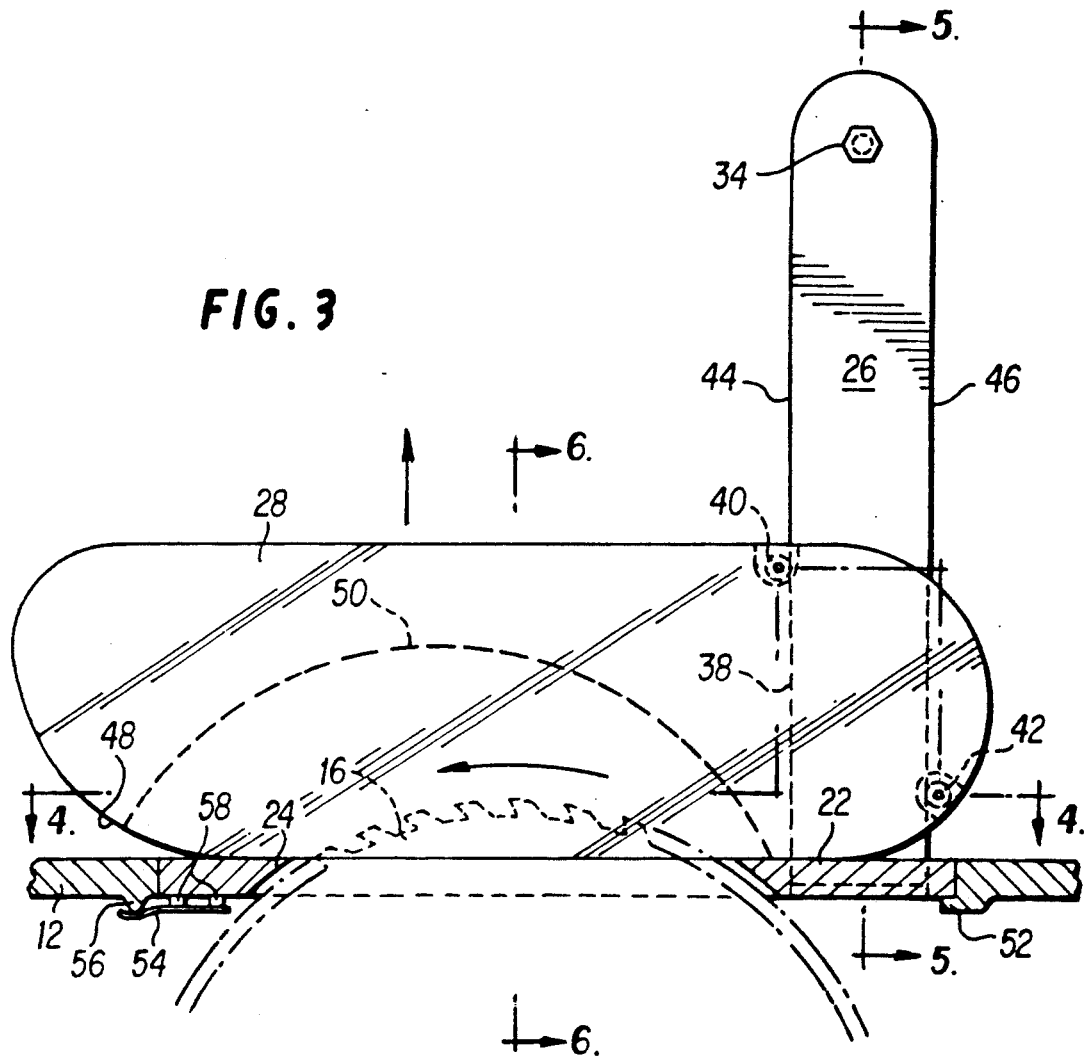
FIG. 3 is a side elevational view of the saw guard of the present invention.
Figure 4:
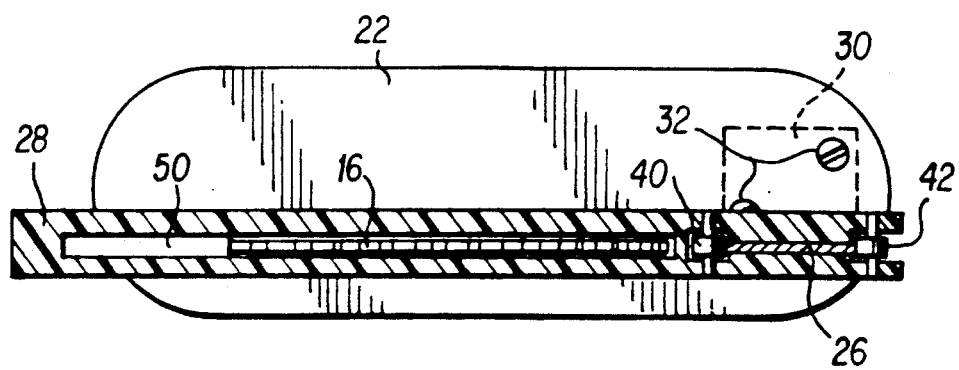
FIG. 4 is a sectional view taken along the line 4—4, in FIG. 3.
Figure 5:
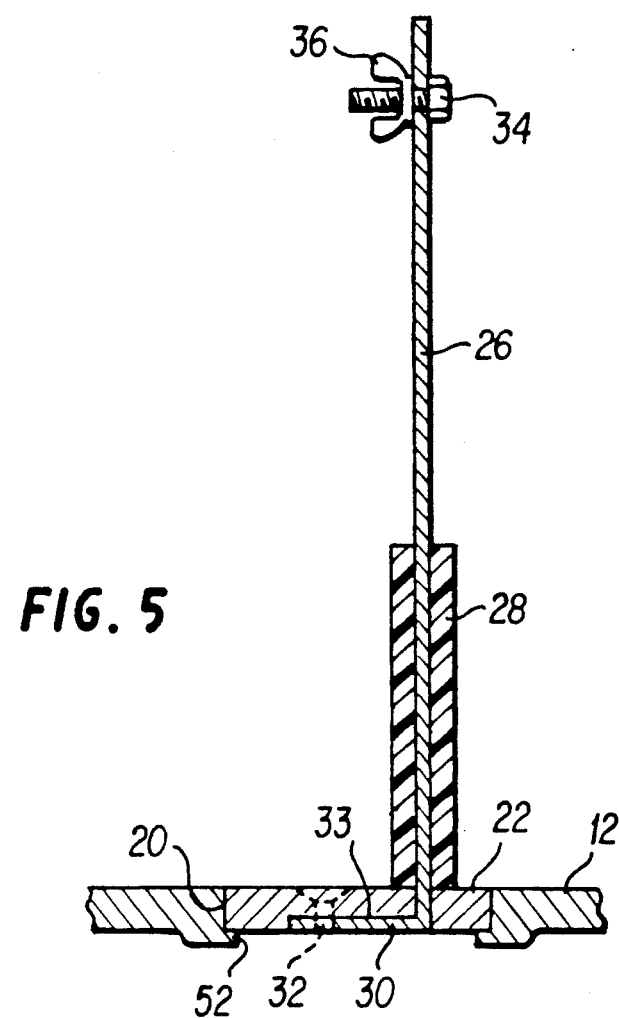
FIG. 5 is a sectional view taken along the line 5—5 in FIG. 3.
Figure 6:
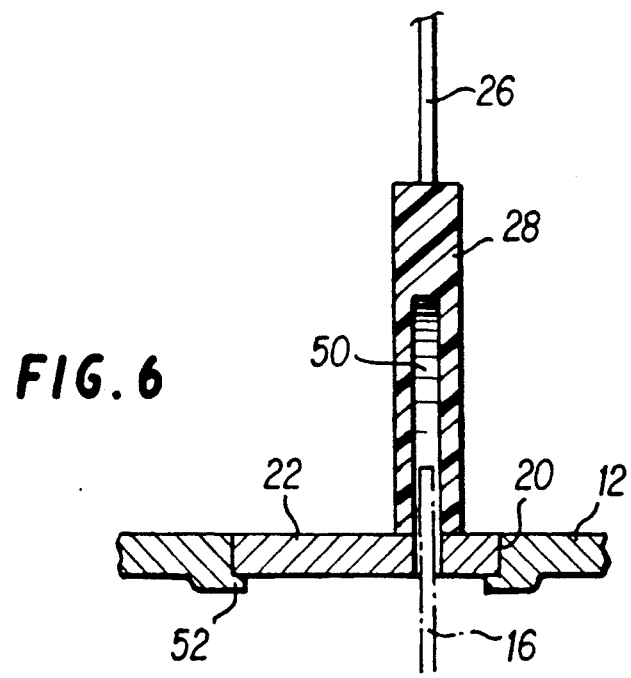
FIG. 6 is a sectional view taken along the line 6—6 in FIG. 3.

Referring to FIGS. 2, 3 and 4 there is shown the details of the table saw guard of the present invention wherein the guide post 26 which may be fabricated from a strip of metal in a "L" shape with the bottom portion 30 of the guide post being fixed to the under portion of the access opening cover 22 by fasteners 32. A recess 33 is provided in the under portion of the access opening cover 22 for receiving the bottom portion 30 of guide post 26 so as to be flush with the under portion.

A bolt 34 and wingnut 36 or other suitable means may be provided as a stop for the table saw guard 28 to prevent accidental removal thereof.

Guide channel 38 is formed through the saw guard to slidingly fit over the guide post 26 such that the saw guard can freely move upwardly in the vertical direction as the material 14 is fed toward the blade 16. An upper bearing 40 is mounted on the saw guard 28 so as to engage the leading edge 44 of guide post 26, and a lower bearing 42 is mounted on the saw guard 28 so as to engage the trailing edge 46 of guide post 26.

As the material to be cut 14 engages the upwardly curve portion 48 of the saw guard 28, the saw guard 28 attempts to rotate in a clockwise direction as viewed in FIG. 3 such that the bearings 40 and 42 prevent such rotation and enhance the smooth upwardly movement of the saw guard 28 on the guide post 26.

A blade receiving channel 50 is provided in the lower portion of the saw guard 28 providing a small clearance on each side of the saw blade 16. Sufficient space is provided in channel 50 above and forward of the blade 16 so as to permit saw dust removed from the material 14 to be moved in a counter clockwise direction as shown in FIG. 3. The saw dust moves to the forward portion of the saw guard 28 in channel 50 and is discharged below the table 12 for easy removal. The operator has an essentially unobstructed view of the blade and work piece during cutting and is not bothered by an accumulation of saw dust above the table 12.

As most clearly illustrated in FIGS. 2, 3, 5 and 6, the access opening cover 22 sits within blade access opening 20 and rest on flange 52 of the underside of table 12 so as to be flush with the top of the table.

A spring metal clip 54 is mounted on the leading under portion of the access opening cover 22 by spacers 58. The clip 54 engages a protrution 56 formed on the under portion of the table 12 to prevent lifting of the access opening cover 22 during operation.

As can be understood from the foregoing description of the present invention, the saw guard 28 and associated access opening cover 22 can be very easily inserted and removed from the table 12. Furthermore the saw guard 28 smoothly rides on guide post 26 through bearings 40 and 42 as the material 14 is fed toward blade 16 for cutting.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A saw guard for a table saw having a horizontal table with a blade access opening and a saw blade extending through the access opening to project above the surface of the table comprising:

said horizontal table having a top surface for supporting material to be cut, and a bottom surface;

a blade access opening cover disposed in said access opening and conforming to the shape thereof, said access opening cover being flush with the top surface of said horizontal table and having an elongated slit formed therein for permitting said saw blade to extend upwardly therethrough;

a guide post fixedly secured to said blade access opening cover to extend vertically above said horizontal table; and a table saw guard mounted on said guide post so as to be vertically slideable on said guide post such that said table saw guard rests on said access opening cover when a cutting operation is not in progress and wherein said saw guard slides upwardly on said guide post during a cutting operation in response to material to be cut being fed into said saw blade.

2. A saw guard according to claim 1, wherein said table saw guard includes a guide channel vertically extending through one end thereof, said guide channel having a leading edge and a trailing edge with at least one bearing mounted therein adjacent the leading edge of said guide post and at least one bearing mounted therein adjacent the trailing edge of said guide post.

3. A saw guard according to claim 2, wherein said bearing mounted adjacent said leading edge of said guide post is disposed at an upper portion of said guide channel and said bearing mounted adjacent said trailing edge of said guide post is disposed at a lower portion of said guide channel.

4. A saw guard according to claim 1, further comprising means secured to the underside of a leading portion of said access opening cover for engaging the bottom surface of said horizontal table for preventing lifting of said access opening cover from said horizontal table during operation of said table saw.

5. A saw guard for a table saw having a horizontal table with a blade access opening and a saw blade extending through the access opening to project above the surface of the table comprising:

said horizontal table having a top surface for supporting material to be cut and a bottom surface;

a blade access opening cover disposed in said access opening and conforming to the shape thereof, said access opening cover being flush with the top surface of said horizontal table and having an elongated slit formed therein for permitting said saw blade to extend upwardly therethrough;

a guide post fixedly secured to said blade access opening cover to extend vertically above said horizontal table;

a table saw guard mounted on said guide post so as to be vertically slideable on said guide post such that said table saw guard rests on said access opening cover when a cutting operation is not in progress and wherein said saw guard slides upwardly on said guide post during a cutting operation in response to material to be cut being fed into said saw blade;

said table saw guard including a guide channel vertically extending through one end thereof, said guide channel having a leading edge and a trailing edge with at least one bearing mounted therein adjacent the leading edge of said guide post and at least one bearing mounted therein adjacent the trailing edge of said guide post;

said bearing mounted adjacent said leading edge of said guide post being disposed at an upper portion of said guide channel and said bearing mounted adjacent said trailing edge of said guide post being disposed at a lower portion of said guide channel; and means secured to the underside of said access opening cover for engaging the bottom surface of said horizontal table for preventing lifting of said access opening cover from said horizontal table during operation of said table saw.

* * * * *